United States Patent Office 2,747,983
Patented May 29, 1956

2,747,983
METHOD AND COMPOSITION FOR THE CONTROL OF THE GROWTH OF VEGETATION

Dorsey R. Mussell, Clare, Mich., assignor to The Dow Chemical Company, Midland, Mich., a corporation of Delaware No Drawing. Application May 11, 1955,
Serial No. 507,730

13 Claims. (Cl. 71—2.3)

This invention is concerned with the suppression of the growth of undesirable vegetation and is particularly directed to a composition and method for the control of the growth of germinant seeds, emerging seedlings and established plants of many undesirable weed species.

It is an object of the present invention to provide a new and improved method for the control of the growth of undesirable vegetation. A further object is to provide a method for the control of many undesirable weeds and particularly those of small seeded grasses in growth media planted with or supporting the growth of many species of cereal grains and broadleaf crop plants. Another object is the provision of a method for the control of the growth of undesirable annual grasses and the seeds and seedlings of such grasses in growth media supporting the growth of established perennial grasses such as bluegrass, Bermuda grass and creeping red fescue. A further object is the provision of a method for the control of many small seeded grasses in soil which is planted to or supporting the growth of cotton or corn. An additional object is the provision of a novel composition adapted to be employed for the accomplishment of the new method of growth control. Other objects will become apparent from the following specification and claims.

According to the present invention it has been discovered that the growth of plants may be controlled by exposing a part of the growing plant to the action of the 2-halo-4,6-ditertiaryalkylphenols of the formula

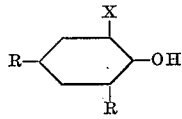

wherein X represents bromine or chlorine and R represents tertiarybutyl or tertiaryamyl. More particularly, it has been discovered that the growth of germinant seeds, seedlings and established vegetation may be suppressed by exposing the germinant seeds, seedlings or the roots or above-ground portions of the growing plants to the action of a growth-inhibiting amount of the above 2-halo-4,6-ditertiaryalkylphenols. These compositions are liquids which are somewhat soluble in many common organic solvents and of very low solubility in water. They have been found to have a high toxicity against the germinant seeds and seedlings of many small seeded grasses. Thus, they may be employed for the selective control of small seeded grasses in growth media planted with or supporting the growth of many species of cereal grains or broadleaf crop plants such as corn and cotton. Further, the compounds have a low toxicity for established stands of perennial grasses when applied to their roots and foliage at dosages which will control the growth of the seeds, seedlings and established stands of annual grasses such as crab grass. Thus, the compounds may be employed for the control of the growth of annual grasses in established turfs of perennial grasses such as bluegrass, Bermuda grass and creeping red fescue.

The exposure of growing plants and plant parts to the action of the 2-halo-4,6-ditertiaryalkylphenols gives rise to varying degrees of response depending upon the nature of the plant or seed, the stage of growth or maturity of the plants, and the dosage at which the exposure is carried out as well as the weather conditions of temperature and moisture. When large dosages are applied to the foliage of plants a substantially complete kill of most plant species is obtained. The distribution of large dosages in growth media controls the growth of most germinant seeds, seedlings and established plants. This approaches a sterilizing action. The weathering action of sun and rain, and possibly the decomposition of the toxic compounds by the action of bacteria and other soil organisms eventually frees the growth media of the toxicants. Soil or foliar applications of more dilute dosages of the toxicant compounds suppress the growth of annual grasses and the growth of the germinant seeds and seedlings of many small seeded perennial grasses while having little or no effect upon established stands of perennial grasses or upon the seeds, emerging seedlings or established plants of many cereal grains and broadleaf crop plants. Thus, the compounds may be employed for the selective control of the growth of the seeds and seedlings of small seeded grasses in plantings or stands of many cereal grains and broadleaf crop plants or for the control of the growth of annual grasses such as crab grass in established stands of perennial grasses.

The supplying of a growth-inhibiting amount of the 2-halo-4,6-ditertiaryalkylphenols in the growth medium or upon the above ground surfaces of plants is essential and critical for the practice of the present invention. The exact dosage to be supplied is dependent upon the plant species to be controlled and the stage of growth thereof as well as the plant part to be contacted with the toxicants. In non-selective foliage treatments, good results are obtained when 3 to 100 pounds of toxicant is applied per acre. In non-selective applications to growth media, good results are obtained when a dosage of toxicant is supplied in the amount of from about 5 to 200 parts or more by weight per million parts by weight of the media. In non-selective applications to soil, good results are obtained when the 2-halo-4,6-ditertiaryalkylphenols are distributed at a rate of from about 1 to 200 pounds or more per acre and through such a cross section of the soil as to provide for the presence therein of an effective concentration of the treating agent. In such application, it is desirable that the compound be distributed to a depth of at least 0.5 inch and at a substantially uniform dosage of at least 1.8 pounds per acre inch of soil. In selective applications to foliage for the control of many undesirable weeds, and especially the seedlings of small seeded grasses in many cereal grains and broadleaf crop plants, a substantially uniform dosage of from 3 to 20 pounds of toxicant per acre may be employed. In selective applications to growth media for the control of the germinant seeds and seedlings of many undesirable weeds, and especially those of small seeded grasses in areas planted with the seeds of many cereal grains and broadleaf crop plants or supporting the growth of such crops, a dosage of from 5 to 50 parts by weight of toxicant per million parts by weight of soil has been found satisfactory. In selective operations for the control of the growth of the annual grasses in established stands of perennial grasses, the application of a dosage of from 3 to 25 pounds of toxicant compound per acre is desirable. In all selective applications, the exact dosage to be employed is dependent upon the resistance of the cereal grains and broadleaf crop plants or their seeds or of the established turf grasses to the toxicant compounds.

The method of the present invention may be carried out by applying to the above ground portion of plants or by applying to and mixing with growth media the unmodified 2-halo-4,6-ditertiaryalkylphenols. However, the present method also embraces the employment of a liquid or dust composition containing the toxicants. In such usage the compounds may be modified with one or a plurality of additaments or herbicide adjuvants such as water, petroleum distillates or other liquid carriers; surface active dispersing agents; and finely divided inert solids. Depending upon the concentration of toxicant, such augmented compositions are adapted to be distributed in the soil, or employed as concentrates and subsequently diluted with additional inert carrier to produce the ultimate treating compositions. The required amount of the toxicant compounds conveniently may be supplied per acre treated in from 40 to 27,000 gallons or more of the liquid carrier or in from about 50 to 2,000 pounds of the inert solid carrier.

The exact concentration of the 2-halo-4,6-ditertiaryalkylphenols to be employed in compositions for application to plants or growth media is not critical and may vary considerably provided the required dosage of effective agent is supplied in the growth media or upon the above ground surfaces of plants. The concentration of toxicant in liquid compositions employed to supply the desired dosage generally is from about 0.001 to 50 percent by weight, although concentrations as high as 90 percent by weight are sometimes employed. In dusts the concentrations of toxicant may be from 0.1 to 20 percent by weight. In compositions to be employed as concentrates, the toxicants may be present in a concentration of from 5 to 95 percent by weight.

The quantity of treating composition to be applied may vary considerably provided that the required dosage of active ingredient is applied in sufficient of the finished composition to cover adequately the vegetation to be treated or to facilitate the penetration and distribution of the active agent in growth media. The required amount of the active agent in the soil conveniently may be supplied per acre treated in from 40 to 27,000 gallons or more of the liquid carrier or in from 50 to 2,000 pounds of the inert solid carrier. In the treatment of seedling weeds, good coverage is obtained when using from 10 to 60 gallons of finished spray composition per acre. Where large succulent vegetation is concerned, it is frequently desirable to employ up to 250 gallons or more of the finished spray composition per acre to assure complete coverage of the above ground portion of the vegetation. In the application of dusts to plant foliage, good results are obtained with from 40 to 2000 pounds of finished dust per acre, the only requirement being that the required toxicant dosage be supplied in sufficient dust to achieve good coverage of the foliage.

Liquid compositions containing the desired amount of active ingredient may be prepared by dissolving the toxicants in an organic liquid or by dispersing the toxicants in water with or without the aid of a suitable surface active dispersing agent such as an ionic or non-ionic emulsifying agent. Suitable organic liquid carriers include the agricultural spray oils and the petroleum distillates such as diesel fuel, kerosene, fuel oil, naphthas and Stoddard solvent. Among the latter the petroleum distillates are generally preferred. The aqueous compositions may contain one or more water immiscible solvents for the toxicant compound. In such compositions, the carrier comprises an aqueous emulsion, i. e. a mixture of water, emulsifying agent and water immiscible solvent. The choice of dispersing and emulsifying agent and the amount thereof employed is dictated by the nature of the composition and by the ability of the agent to facilitate the dispersion of the toxicant compounds in the carrier to produce the desired composition. Dispersing and emulsifying agents which may be employed in the compositions include the condensation products of alkylene oxides with phenols and organic acids, alkyl aryl sulfonates, polyoxyalkylene derivatives of sorbitan esters, complex ether alcohols, mahogany soaps and the like.

In the preparation of dust compositions, the active ingredient is dispersed in and on a finely divided inert solid such as clay, talc, chalk, gypsum and the like. In such operation, the finely divided carrier is mechanically mixed or ground with the 2-halo-4,6-ditertiaryalkylphenols.

Similarly, dust compositions containing the toxicant compounds may be prepared from various of the solid surface active dispersing agents such as bentonite, fuller's earth, attapulgite and other clays. Depending upon the proportion of ingredients, these dust compositions may be employed as concentrates and subsequently diluted with additional solid surface active dispersing agents or with chalk, talc or gypsum and the like to obtain the desired amount of active ingredient in a composition adapted to be employed for the suppression of the growth of the plants. Also, such dust compositions may be dispersed in water, with or without the aid of a dispersing agent, to form spray mixtures.

When operating in accordance with the present invention, growth altering amounts of 2-halo-4,6-ditertiaryalkylphenols are dispersed in soil or growth media in any convenient fashion. Applications to growth media may be carried out by simply mixing with the media, by applying to the surface of soil and thereafter dragging or discing into the soil to the desired depth or by employing a liquid carrier to accomplish the penetration and impregnation. The application of spray and dust compositions to the surface of said or to the above ground surfaces of plants may be carried out by conventional methods, e. g. power dusters, boom and hand sprayers and spray dusters.

In a further method, the distribution of the 2-halo-4,6-ditertiaryalkylphenols in soil may be accomplished by introducing the agent in the water employed to irrigate the soil. In such procedures, the amount of water may be varied with the porosity and water holding capacity of the soil to obtain a desired depth of distribution of the agent.

The following examples illustrate the invention but are not to be construed as limiting the same:

*Example 1*

Twenty-five parts by weight of the various 2-halo-4,6-ditertiaryalkylphenols were mechanically mixed with 10 parts of the dimeric alkylated aryl polyether alcohols (Triton X–155) and 65 parts of xylene to produce concentrates in the form of emulsifiable liquids. Portions of these concentrates were dispersed in water to produce aqueous compositions containing 0.04 pound of one of the phenol compounds per 100 gallons of ultimate mixture. These compositions were employed for the treatment of soil areas which had been prepared and seeded to Japanese millet, radish and wild oats. In the treating operations, the compositions were applied to the soil areas as a soil drench and at a rate of about 0.44 acre inch of aqueous composition per acre to supply substantially uniform dosages of 50 pounds of one of the toxicant compounds per acre. This dosage corresponds to a concentration of about 82 parts by weight of toxicant per million parts by weight of soil. Other areas similarly prepared and seeded were left untreated to serve as checks.

After three weeks the treated areas were examined to ascertain what control of the growth of seeds and emerging seedlings had been obtained. The results are set forth in the following table:

| Test Compound | Percent Control of the Growth of Seeds and Emerging Seedlings | | |
|---|---|---|---|
| | Millet | Radish | Wild Oats |
| 2-bromo-4,6-ditertiarybutylphenol | 100 | 30 | 100 |
| 2-chloro-4,6-ditertiarybutylphenol | 100 | 30 | 100 |
| 2-bromo-4,6-ditertiaryamylphenol | 100 | 0 | 95 |
| 2-chloro-4,6-ditertiaryamylphenol | 100 | 40 | 99 |

At the time of observation, the check areas showed vigorously growing stands of the named plant species.

Example 2

Portions of the concentrate compositions containing 2-halo-4,6-ditertiaryamylphenol as prepared in Example 1 were dispersed in water to prepare aqueous spray compositions containing 0.04 pound of one of the phenol compounds per 100 gallons of ultimate mixture. These compositions were employed as described in the preceding example for the control of millet and radish. In the treating operations the compositions were applied as a soil drench and at a rate of 0.44 acre inch of aqueous composition per acre to supply substantially uniform dosages of 12.5 pounds of one of the toxicant compounds per acre. This dosage corresponds to a concentration of 20.5 parts by weight of toxicant compound per million parts by weight of soil. The results are set forth in the following table:

| Test Compound | Percent Control of the Growth of Seeds and Emerging Seedlings | |
|---|---|---|
| | Millet | Radish |
| 2-bromo-4,6-ditertiary-amylphenol | 95 | 0 |
| 2-chloro-4,6-ditertiary-amylphenol | 100 | 10 |

In the check areas there was found substantially complete germination of both plant species.

Example 3

A portion of the concentrate composition containing 2-bromo-4,6-ditertiarybutylphenol as prepared in Example 1 was dispersed in water to prepare an aqueous emulsion composition containing 0.077 pound of toxicant per 100 gallons of ultimate mixture. This composition was employed for the treatment of areas of soil and observations made of the control of the growth of the seeds and emerging seedlings of various grass species and broadleaf plants. The small seeded grass species includes crab grass, bluegrass and Japanese millet; the cereal grains, corn and winter wheat; and the broadleaf plants, cotton, soy beans, pig weed and radish. In the tests the composition was employed to treat soil areas which had been prepared and seeded with the named plant species. In the treating operations, the composition was applied as a soil drench and at a rate of 0.305 acre inch of composition per acre to supply a substantially uniform dosage of 6.4 pounds of 2-bromo-4,6-ditertiarybutylphenol per acre. This dosage corresponds to a concentration of about 10 parts by weight of 2-bromo-4,6-ditertiarybutylphenol per million parts by weight of soil. Other areas similarly seeded with the named plant species were left untreated to serve as checks. After three weeks the treated areas were examined to ascertain the control of the growth of seeds and emerging seedlings. The results are set forth in the following table:

| Seed Species | Percent Control of the Growth of Seeds and Emerging Seedlings |
|---|---|
| crab grass | 70 |
| blue grass | 90 |
| Japanese millet | 70 |
| corn | 0 |
| winter wheat | 10 |
| cotton | 0 |
| soy beans | 0 |
| pig weed | 50 |
| radish | 0 |

At the time of observation, abundant and vigorously growing stands of the named plant species were found in the check areas.

Example 4

A portion of the emulsifiable concentrate composition containing 2-chloro-4,6-ditertiarybutylphenol as prepared in Example 1 was dispersed in water to prepare an aqueous emulsion composition containing 0.035 pound of the toxicant per 100 gallons of ultimate mixture. This composition was employed as described in Example 3 for the control of the growth of the germinant seeds and emerging seedlings of several grass species and broadleaf plants. In the treating operations, the composition was applied as a soil drench and at a rate of 0.305 acre inch of composition per acre to supply a substantially uniform dosage of 3.2 pounds of 2-chloro-4,6-ditertiarybutylphenol per acre. This dosage corresponds to a concentration of about 5 parts of 2-chloro-4,6-ditertiarybutylphenol per million parts by weight of soil. The results are set forth in the following table:

| Seed Species | Percent Control of the Growth of Seeds and Emerging Seedlings |
|---|---|
| crab grass | 30 |
| blue grass | 90 |
| Japanese millet | 80 |
| corn | 0 |
| winter wheat | 0 |
| soy beans | 0 |
| pig weed | 20 |
| radish | 0 |

In the check areas vigorously growing stands of the named plant species were found at the time of the observations.

Example 5

Portions of the concentrate composition containing 2-bromo-4,6-ditertiarybutylphenol as prepared in Example 1 were dispersed in water to prepare aqueous compositions containing 0.18, 0.36 and 0.72 pound of toxicant per 100 gallons of ultimate mixture. These compositions were employed as described in Example 3 for the control of the growth of the germinant seeds and emerging seedlings of several grass species and broadleaf plants. In the treating operations the compositions were applied as a soil drench and at a rate of 0.203 acre inch of composition per acre to supply substantially uniform dosages of 10, 20 and 40 pounds of 2-bromo-4,6-ditertiarybutylphenol per acre. These dosages correspond, respectively, to concentrations of about 24, 48 and 96 parts by weight of 2-bromo-4,6-ditertiarybutylphenol per million parts by weight of soil. The results are set forth in the following table:

| Seed Species | Percent Control of the Growth of Seeds and Emerging Seedlings at the Various Indicated Dosages of Toxicant in Pounds per Acre | | |
|---|---|---|---|
| | 10 | 20 | 40 |
| blue grass | 100 | 100 | 100 |
| domestic oats | 10 | 60 | 90 |
| winter wheat | 0 | 10 | 60 |
| flax | 0 | 20 | 50 |
| radish | 0 | 0 | 0 |
| bean | 0 | 0 | 0 |

The check areas supported abundant stands of the named plant species.

Example 6

In a further operation a portion of the emulsifiable concentrate composition containing 2-chloro-4,6-ditertiarybutylphenol as prepared in Example 1 was dispersed in water to produce an aqueous emulsion composition containing 0.077 pound of toxicant per 100 gallons of ultimate mixture. This composition was employed as described in Example 3 for the control of the growth of germinant seeds and emerging seedlings of several grass species and broadleaf crop plants. In the treating operations the composition was employed as a soil drench and at a rate of 0.305 acre inch of composition per acre to supply a substantially uniform dosage of 6.4 pounds of 2-chloro-4,6-ditertiarybutylphenol per acre. This dosage corresponds to a concentration of about 10 parts by weight of toxicant per million parts by weight of soil. The results are set forth in the following table:

| Seed Species | Percent Control of the Growth of Seeds and Emerging Seedlings |
|---|---|
| crab grass | 100 |
| blue grass | 100 |
| Japanese millet | 90 |
| corn | 10 |
| winter wheat | 5 |
| pig weed | 80 |
| radish | 0 |

In the check plots substantially complete germination and vigorous growth was observed for all named plant species.

*Example 7*

A portion of the emulsifiable concentrate composition containing 2-chloro-4,6-ditertiarybutylphenol as prepared in Example 1 was dispersed in water to prepare aqueous emulsion compositions containing 10 and 20 pounds of 2-chloro-4,6-ditertiarybutylphenol per 40 gallons of ultimate mixture. These compositions were applied to the foliage of plots of seedlings of various grass species and broadleaf plants. At the time of the applications the seedling plants were about one and one-half inches tall. The treatment was carried out with conventional spraying equipment and at a dosage of 40 gallons of spray mixture per acre. Similar plots of the named plant species were left untreated to serve as checks.

After three weeks the treated plots were examined to ascertain what control of the growth of seedling plants had been obtained. The results are set forth in the following table:

| Seedling Species | Percent Control of the Growth of Seedling Species at the Indicated Dosage of Toxicant in Pounds per Acre | |
|---|---|---|
| | 10 lbs. | 20 lbs. |
| crab grass | 90 | 90 |
| creeping red fescue | 90 | 95 |
| blue grass | 100 | 100 |
| German millet | 99 | 90 |
| oats | 20 | 20 |
| spring wheat | 20 | 20 |
| cotton | 0 | 0 |
| soy bean | 10 | 10 |
| flax | 10 | 0 |

At the time of observation, heavy stands of the named plant species were found in the check plots.

*Example 8*

2-chloro-4,6-ditertiarybutylphenol is dispersed in kerosene to produce spray compositions containing 2 ounces and 4 ounces of the phenol compound per gallon of ultimate mixture. These compositions are employed for the control of a heavy infestation of crab grass in an established lawn of bluegrass and creeping red fescue. In such operations, the spray mixtures are applied to the lawn areas with conventional spray equipment at a rate of 100 gallons per acre. Adjacent lawn areas similarly infested with crab grass are left untreated to serve as checks.

Two weeks following the applications, the treated areas are examined and a 100 percent kill of crab grass observed at both treatment dosages. At the time of observation, the stands of bluegrass and creeping red fescue in the treated areas are found to be unharmed and comparable to those in the untreated checks.

*Example 9*

20 parts by weight of 2-chloro-4,6-ditertiarybutylphenol was mixed with 80 parts of the dioctyl ester of sodium sulfosuccinic acid (Aerosol OT) to prepare a concentrate composition in the form of a dispersible liquid. A portion of this composition was dispersed in water to produce an aqueous spray composition containing 10 pounds of the phenol compound per 100 gallons of ultimate mixture. This composition was applied to the stalks and foliage of stands of cotton which were about 3 inches tall and in the two leaf stage. The application was made with conventional spray equipment and the cotton plants wet with the spray mixture to the point of run-off. Similar stands of cotton were left untreated to serve as checks.

At intervals following the application, the treated stands were examined for evidence of injury attributable to the treatments. As a result of the observations, there was found no evidence of injury to the cotton attributable to the phenol compound.

*Example 10*

Ten parts by weight 2-bromo-4,6-ditertiarybutylphenol, 86 parts of diatomaceous earth and 4 parts of an alkylated aryl polyether alcohol (Triton X-100) are mechanically mixed and ground together to prepare a concentrate composition in the form of a wettable powder.

In a further operation, 25 parts by weight of 2-chloro-4,6-ditertiaryamylphenol and 10 parts of Triton X-100 are mechanically mixed together to produce a concentrate composition in the form of a dispersible liquid.

These concentrate compositions are adapted to be dispersed in water to prepare aqueous compositions which have very desirable wetting and penetrating properties. The latter aqueous compositions are adapted to be employed to distribute the phenol compositions in growth inhibiting dosages.

The term "plant part" as employed in the present specification and claims is intended to be inclusive of the stems, branches, roots, foliage and germinant seeds of plants. The expression "growth media and soil" are herein employed in their broadest sense to be inclusive of all conventional "soils" as defined in Webster's New International Dictionary, second edition, unabridged, published in 1937 by G. and C. Merriam Company, Springfield, Massachusetts. Thus, the terms refer to any substance or media in which vegetation may take root and grow, and are intended to include not only earth but compost, manure, muck, humus, and sand and the like, adapted to support plant growth.

The 2-halo-4,6-ditertiaryalkylphenol as employed in accordance with the present invention may be prepared by the direct halogenation of an appropriate 4,6-ditertiaryalkylphenol whereby halogen is substituted for the 2-position on the phenol compound. In such operation, the 4,6-ditertiaryalkylphenol is treated with gaseous chlorine or liquid bromine at a temperature of from 25° to 50° C. Following the reaction, the desired product is separated by fractional distillation under reduced pressure.

I claim:

1. A method which comprises exposing growing plants and plant parts to the action of a growth inhibiting amount of a 2-halo-4,6-ditertiaryalkylphenol of the formula

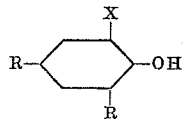

wherein X represents a member of the group consisting of bromine and chlorine and R represents a member of the group consisting of tertiarybutyl and tertiaryamyl.

2. A method claimed in claim 1 wherein the 2-halo-4,6-ditertiaryalkylphenol is employed in the form of a composition made up of the phenol compound in intimate admixture with a herbicide adjuvant as a carrier therefor.

3. An agronomical practice which comprises impregnating soil with a growth-inhibiting amount of a 2-halo-4,6-ditertiaryalkylphenol of the formula

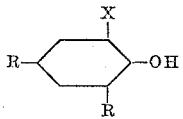

wherein X represents a member of the group consisting of bromine and chlorine and R represents a member of the group consisting of tertiarybutyl and tertiaryamyl.

4. A method for the selective control of the growth of the germinant seeds and seedlings of small seeded grasses in plantings and established stands of cereal grains and broadleaf crop plants which comprises exposing the growing plants and plant parts to the action of a 2-halo-4,6-ditertiaryalkylphenol of the formula

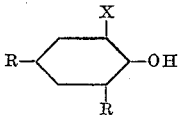

wherein X represents a member of the group consisting of bromine and chlorine and R represents a member of the group consisting of tertiarybutyl and tertiaryamyl, the exposure being carried out at a dosage sufficient to control the growth of the grass without substantially injuring the cereal grains and broadleaf crop plants.

5. A method for the selective control of the growth of the germinant seeds and seedlings of small seeded grasses in plantings and established stands of cotton and corn which comprises exposing the growing plants and plant parts to the action of a 2-halo-4,6-ditertiaryalkylphenol of the formula

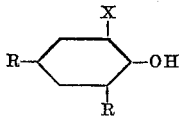

wherein X represents a member of the group consisting of bromine and chlorine and R represents a member of the group consisting of tertiarybutyl and tertiaryamyl, the exposure being carried out at a dosage sufficient to control the growth of grass without substantially injuring the cotton and corn.

6. A method for the selective control of crab grass in established stands of perennial grass which comprises applying to the foliage and soil about the crowns of the grass a compound of the formula

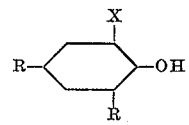

wherein X represents a member of the group consisting of bromine and chlorine and R represents a member of the group consisting of tertiarybutyl and tertiaryamyl, the applications being carried out at a dosage sufficient to control the growth of crab grass without substantially injuring the perennial grasses.

7. A method which comprises exposing growing plants and plant parts to the action of a growth-inhibiting amount of 2-chloro-4,6-ditertiarybutylphenol.

8. A method which comprises exposing growing plants and plant parts to the action of a growth-inhibiting amount of 2-bromo-4,6-ditertiarybutylphenol.

9. A method which comprises exposing growing plants and plant parts to the action of a growth-inhibiting amount of 2-chloro-4,6-ditertiaryamylphenol.

10. A method which comprises exposing growing plants and plant parts to the action of a growth-inhibiting amount of 2-bromo-4,6-ditertiaryamylphenol.

11. A concentrate composition comprising from 5 to 95 percent by weight of an active toxic ingredient in intimate admixture with a finely-divided inert solid, the active ingredient being a 2-halo-4,6-ditertiaryalkylphenol of the formula

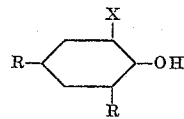

wherein X represents a member of the group consisting of bromine and chlorine and R represents a member of the group consisting of tertiarybutyl and tertiaryamyl.

12. A concentrate composition comprising from 5 to 95 percent by weight of an active toxic ingredient in intimate admixture with a surface active dispersing agent, the active ingredient being a 2-halo-4,6-ditertiaryalkylphenol of the formula

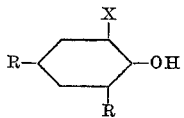

wherein X represents a member of the group consisting of bromine and chlorine and R represents a member of the group consisting of tertiarybutyl and tertiaryamyl.

13. A composition comprising an aqueous dispersion of the composition claimed in claim 12, the active ingredient being present in the amount of at least 0.0011 percent by weight.

No references cited.